Oct. 13, 1925.

G. J. BARTHEL

CLUTCH LEVER HOLDER

Filed April 18, 1925

1,557,134

INVENTOR.
Gregor J. Barthel
BY David E. Carlsen
ATTORNEY.

Patented Oct. 13, 1925.

1,557,134

UNITED STATES PATENT OFFICE.

GREGOR J. BARTHEL, OF ALBERTVILLE, MINNESOTA.

CLUTCH-LEVER HOLDER.

Application filed April 18, 1925. Serial No. 24,117.

*To all whom it may concern:*

Be it known that I, GREGOR J. BARTHEL, a citizen of the United States, residing at Albertville, in the county of Wright and State of Minnesota, have invented certain new and useful Improvements in Clutch-Lever Holders, of which the following is a specification.

My invention relates to a clutch lever holding device and is particularly adaptable for use on the so-called Fordson tractors. The object is to provide a simple, efficient and reliable holding device mounted and operated in such a manner as to engage and hold the foot operated clutch lever in a certain position and may readily be made inoperative when it is desired to restore the clutch lever to its original position.

Figure 1:
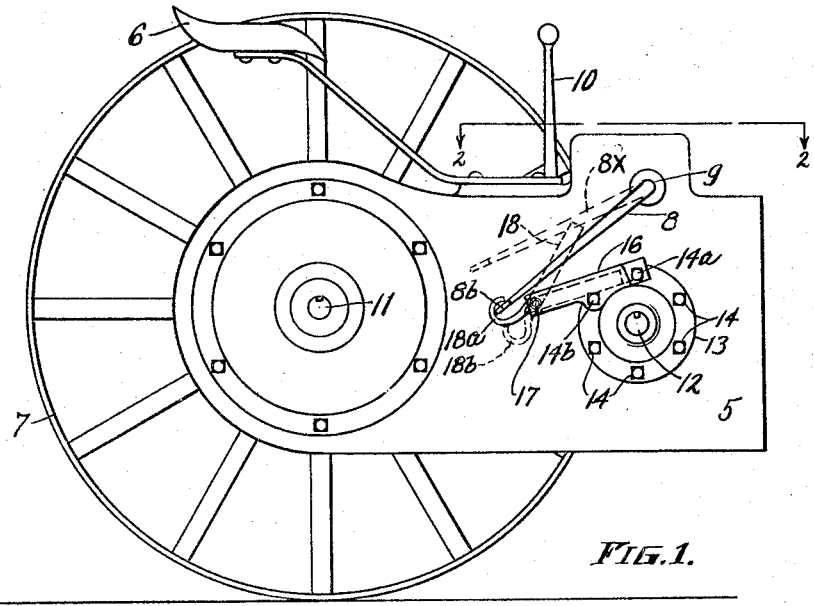
Fig. 1 is a right side elevation of the rear part of a tractor of the Fordson type and my device in operative position, the right hand rear wheel of the tractor being omitted.
Figure 2:
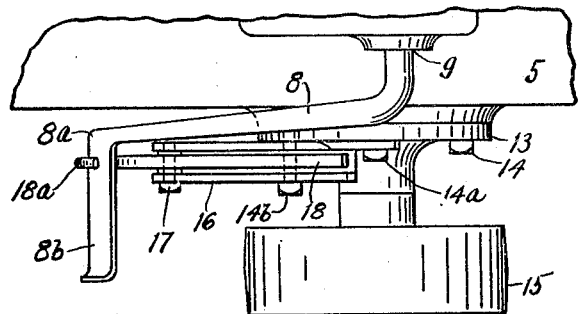
Fig. 2 is an enlarged detail top view about as on line 2—2 in Fig. 1 showing mainly my device in operative position.

Referring to the drawing by reference numerals 5 designates the transmission housing and rear wheel driving mechanism inclosure of a tractor of the type known as the Fordson tractor, 6 is the driver's seat suitably mounted above the rear axle, 7 is the left hand rear supporting and traction wheel. 8 is the clutch foot lever oscillable in and protruding from the transmission housing as at 9, thence rearwardly and thence outwardly horizontally as at $8^a$ to form a foot engaging part $8^b$.

Under normal driving conditions when the tractor is in motion and the speed regulating lever 10 has been properly set the clutch lever is in the position $8^x$ shown dotted in Fig. 1. Power is then transmitted directly from the engine (not shown) through the transmission and thence to the rear axle.

12 is a shaft on which is mounted a pulley 15 rotated by suitable gears in the transmission housing, said shaft rotated in a bearing casting 13 suitably bolted as at 14 to the side of the housing 5.

My device comprises preferably an upwardly opening channel shaped member 16 secured preferably by two of the upper bolts 14, as $14^a$ and $14^b$, in Fig. 1 and extending rearwardly therefrom. In the rear end of said member I provide a transverse pivot pin 17 on which is pivotally secured a tilting member 18 the front end of which normally lies in the channel 16 and the rear end is preferably reduced to a round bar bent into the form of an upwardly opening hook $18^a$. This hook is located in such position that it is engaged by the clutch lever member $8^b$ when the latter is moved down by the foot of the tractor operator. Said movement causes the hook $18^a$ to be tilted downwardly on pivot 17 about as to the position $18^b$ in Fig. 1, when member $8^b$ will be automatically caught within the hook $18^a$ (see full lines in Fig. 1) and the normal upward tendency of the clutch lever will cause better engagement of hook $18^a$ and arm 18 will instantly fall back into the channel and bear against the bottom of it when the operator removes his foot from the lever member $8^b$. Thus the clutch lever is held in the position shown in full lines in Fig. 1, said position being known as neutral. In this position of the clutch lever there is no power transmitted to the rear axle and the tractor thus being stationary the belt pulley may be used.

The clutch lever is readily disengaged by simply swinging hook $18^a$ down while exerting a downward pressure on its horizontal arm $8^b$.

I claim—

1. In a tractor having a vertically oscillable clutch lever with a horizontal foot engaging part, a clutch lever holder comprising an elongated body member fixed in a plane parallel to the movement of said clutch lever, a rock lever pivotally secured in said elongated member, one part of said rock lever adapted to normally rest in said body member and a hook member in the other end of said lever adapted to engage and hold the clutch lever in a predetermined position, said hook portion of the rock lever comprising an upwardly opening hook arranged in the path of the horizontal foot engaging part of the tractor clutch lever to be tilted by the downwardly directed engagement of the latter until the said hook engages the said part of the clutch lever.

2. In a tractor having a vertically oscillable clutch lever with a horizontal foot engaging part, a clutch lever holder comprising an elongated body member fixed in a plane parallel to the movement of said clutch lever, a rock lever pivotally secured in said elongated member, one part of said rock lever adapted to normally rest in said body member and a hook member in the other end of said lever adapted to engage and hold the clutch lever in a predetermined position, said elongated body member consisting of an upwardly opening channel and said rock lever is pivotally secured in the end thereof nearest the free end of the clutch lever and said rock lever forward of its pivot comprises a bar adapted to normally lie in said channel.

In testimony whereof I affix my signature.

GREGOR J. BARTHEL.